United States Patent
Welch et al.

(10) Patent No.: US 8,720,183 B2
(45) Date of Patent: May 13, 2014

(54) THRUST REVERSER TRANSLATING SLEEVE ASSEMBLY

(75) Inventors: John Michael Welch, Wichita, KS (US); Christopher Steven Sawyer, Udall, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 738 days.

(21) Appl. No.: 13/038,621

(22) Filed: Mar. 2, 2011

(65) Prior Publication Data
US 2013/0075492 A1  Mar. 28, 2013

(51) Int. Cl.
F02K 3/02 (2006.01)
F02K 1/76 (2006.01)

(52) U.S. Cl.
CPC *F02K 1/763* (2013.01); *F02K 1/766* (2013.01)
USPC ............... 60/226.2; 244/110 B; 244/129.4

(58) Field of Classification Search
CPC ............................. F02K 1/763; F02K 1/766
USPC ................ 60/226.2, 226.3; 244/110 B, 129.4
See application file for complete search history.

(56) References Cited

U.S. PATENT DOCUMENTS

| 4,585,189 | A | * | 4/1986 | Buxton | 244/54 |
| 4,629,146 | A | * | 12/1986 | Lymons | 244/53 R |
| 4,679,750 | A | * | 7/1987 | Burhans | 244/129.4 |
| 4,697,763 | A | * | 10/1987 | Vermilye | 244/129.4 |
| 5,350,136 | A | * | 9/1994 | Prosser et al. | 244/129.4 |
| 5,778,659 | A | * | 7/1998 | Duesler et al. | 60/226.1 |
| 6,592,074 | B2 | * | 7/2003 | Dehu et al. | 244/110 B |
| 8,505,307 | B2 | * | 8/2013 | Wang | 60/771 |
| 2010/0050596 | A1 | * | 3/2010 | Winter et al. | 60/226.3 |
| 2010/0064660 | A1 | * | 3/2010 | Vauchel et al. | 60/226.2 |
| 2010/0218480 | A1 | * | 9/2010 | Vauchel et al. | 60/226.2 |
| 2011/0120079 | A1 | * | 5/2011 | Schwark et al. | 60/226.2 |
| 2013/0091825 | A1 | * | 4/2013 | Joret et al. | 60/226.2 |

* cited by examiner

*Primary Examiner* — William H Rodriguez
(74) *Attorney, Agent, or Firm* — Hovey Williams LLP

(57) ABSTRACT

A translating sleeve assembly for use with an aircraft engine thrust reverser broadly comprises a slider track, a lifting bolt, and a hinge. The slider track may include a tubular sidewall and a guide channel formed therein that follows a curved path along a length thereof. The lifting bolt may be slidably positioned within the slider track. The hinge may include a first hinge element with a base coupled to an outer cowl shroud, a second hinge element with a hinge rod slidably positioned within the guide channel, and a pin about which the first hinge element and the second hinge element pivot. During deployment of the thrust reverser, the lifting bolt slides aftward and the hinge rod slides within the guide channel, urging the lifting bolt to pivot and the hinge to open, thereby lifting the outer cowl shroud away from the center of the aircraft engine.

15 Claims, 6 Drawing Sheets

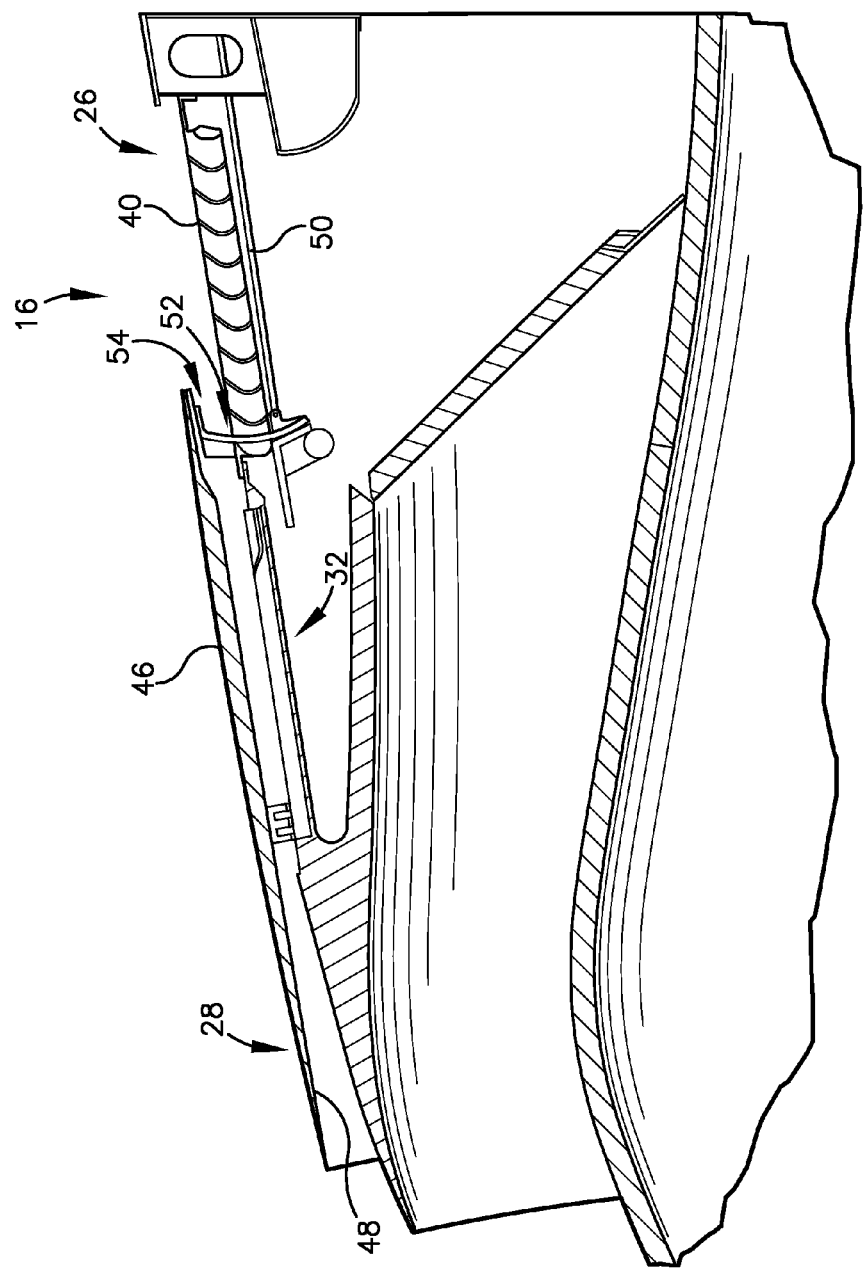

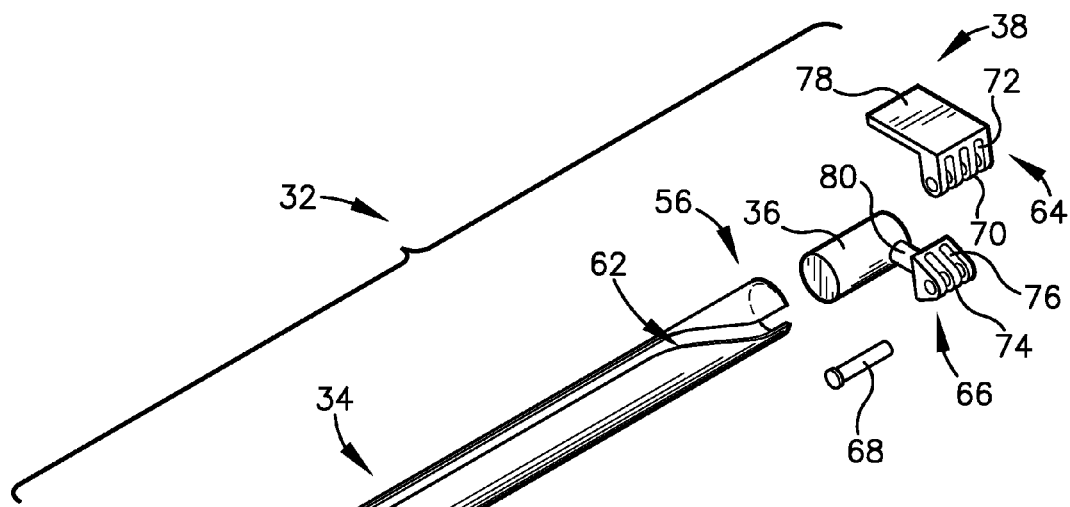
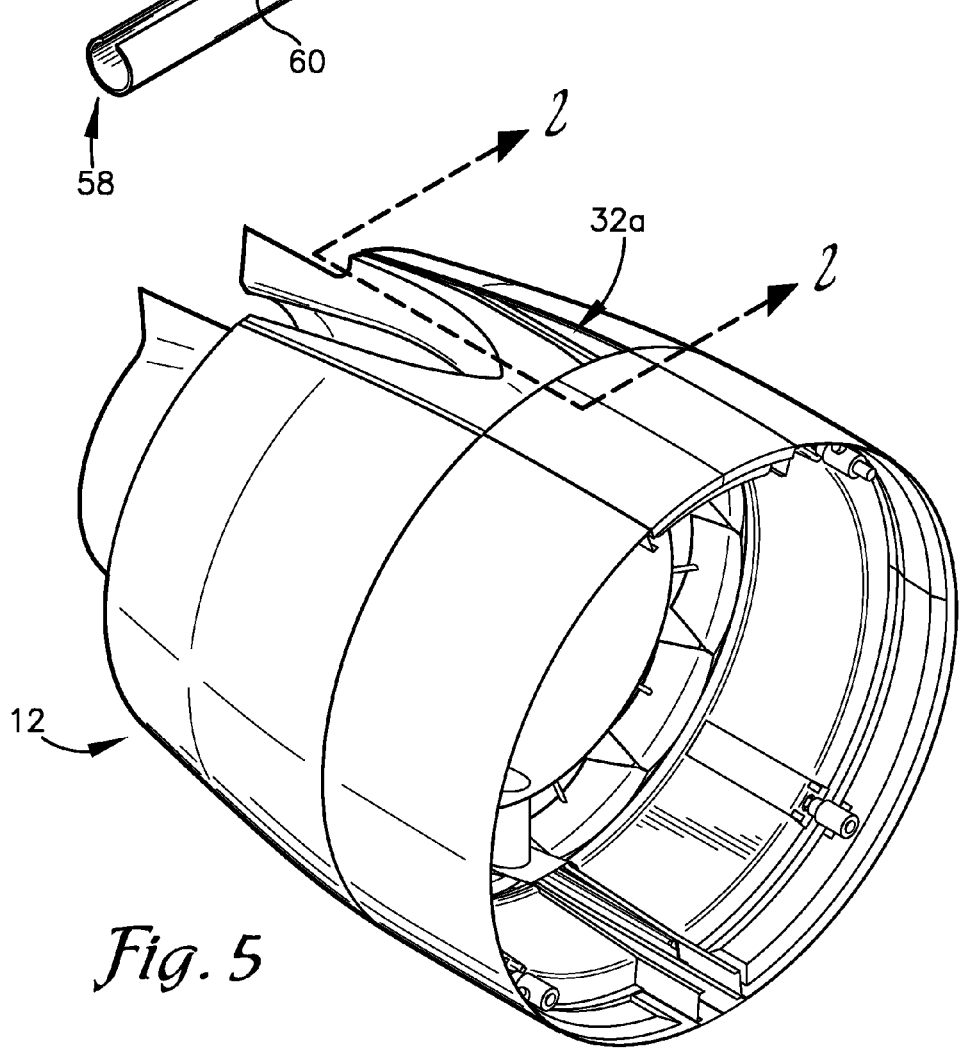

THRUST REVERSER TRANSLATING SLEEVE ASSEMBLY

BACKGROUND OF THE INVENTION

1. Field of the Invention

Embodiments of the present invention relate to aircraft engine thrust reversers. More particularly, embodiments of the present invention relate to aircraft engine thrust reversers with translating and lifting sleeve assemblies.

2. Description of the Related Art

Aircraft engine thrust reversers may include a plurality of cascade elements positioned along an outer perimeter of an engine. The cascade elements may include an array of openings, wherein at least one wall of each opening is curved forward with respect to the engine. When the thrust reverser is stowed, the cascade elements are covered by an outer cowl shroud. During deployment of the thrust reverser, the outer cowl shroud is translated aftward and a portion of the airflow through the engine is directed through the openings of the cascade elements to provide reverse thrust. Occasionally, the outer cowl shroud may not fully clear the cascade elements, resulting in less than optimal reverse thrust. Additionally, the translating sleeve is usually composed of an acoustic fan duct element and an outer cowl aerodynamic element, both of which have to translate over a significant stroke distance to expose the cascade elements for reverse thrust.

SUMMARY OF THE INVENTION

Embodiments of the present invention solve the above-mentioned problems and provide a distinct advance in the art of aircraft engine thrust reversers. More particularly, embodiments of the invention provide a translating set assembly for use with an aircraft engine thrust reverser that lifts an outer cowl shroud away from the engine as the outer cowl shroud translates aftward.

An embodiment of the translating sleeve assembly broadly comprises a slider track, a lifting bolt, and a hinge. The slider track may include a tubular sidewall with a guide channel formed therein that follows a curved path along the length thereof. The lifting bolt is slidably positioned within the slider track. The hinge may include a first hinge element with a base coupled to an outer cowl shroud, a second hinge element with a hinge rod slidably positioned within the guide channel and coupled to the lifting bolt, and a pin about which the first hinge element and the second hinge element pivot.

During deployment of the thrust reverser, the outer cowl shroud may be pushed aftward such that the lifting bolt slides within the slider track and the hinge rod slides within the guide channel, urging the lifting bolt to pivot and the hinge to open, thereby lifting the outer cowl shroud away from the center of the aircraft engine. In this embodiment, only the outer aerodynamic cowl has to be translated aft to expose the cascades for reverse thrust, and the stroke length is significantly shorter.

Other embodiments of the present invention may include an aircraft engine thrust reverser broadly comprising a left outer cowl shroud, a right outer cowl shroud, and first, second, third, and fourth translating sleeve assemblies. The left outer cowl shroud may include a first inner surface, a first lower portion, and a first upper portion. The right outer cowl shroud may include a second inner surface, a second lower portion, and a second upper portion.

The first translating sleeve assembly may include a first hinge coupled to the first upper portion of the first inner surface. The first hinge may be operable to open while translating aftward. The second translating sleeve assembly may include a second hinge coupled to the second upper portion of the second inner surface. The second hinge may be operable to open while translating aftward. The third translating sleeve assembly may include a third hinge coupled to the first lower portion of the first inner surface. The third hinge may be operable to open while translating aftward. The fourth translating sleeve assembly may include a fourth hinge coupled to the second lower portion of the second inner surface. The fourth hinge may be operable to open while translating aftward.

During deployment of the thrust reverser, the left outer cowl shroud may be pushed aftward along with the first hinge and the third hinge, thereby opening the first hinge and the third hinge such that the left outer cowl shroud is lifted away from the center of the aircraft engine, and the right outer cowl shroud may be pushed aftward along with the second hinge and the fourth hinge, thereby opening the second hinge and the fourth hinge such that the right outer cowl shroud is lifted away from the center of the aircraft engine.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 3 is a sectional view of at least a portion of the aircraft engine thrust reverser in the deployed position;

FIG. 4 is a perspective exploded view of a translating sleeve assembly constructed in accordance with various embodiments of the present invention;

FIG. 5 is a perspective view of an aircraft engine nacelle showing at least a portion of the thrust reverser in the stowed position;

Figure 1:
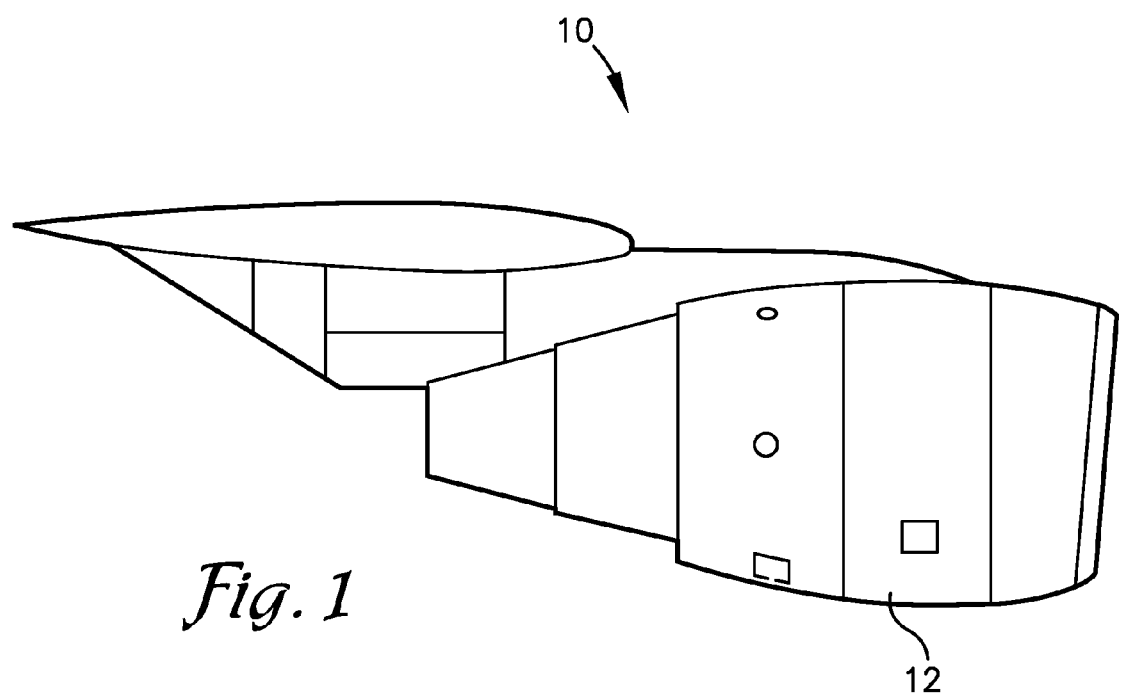
FIG. 1 is a side view of an under-wing aircraft engine.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
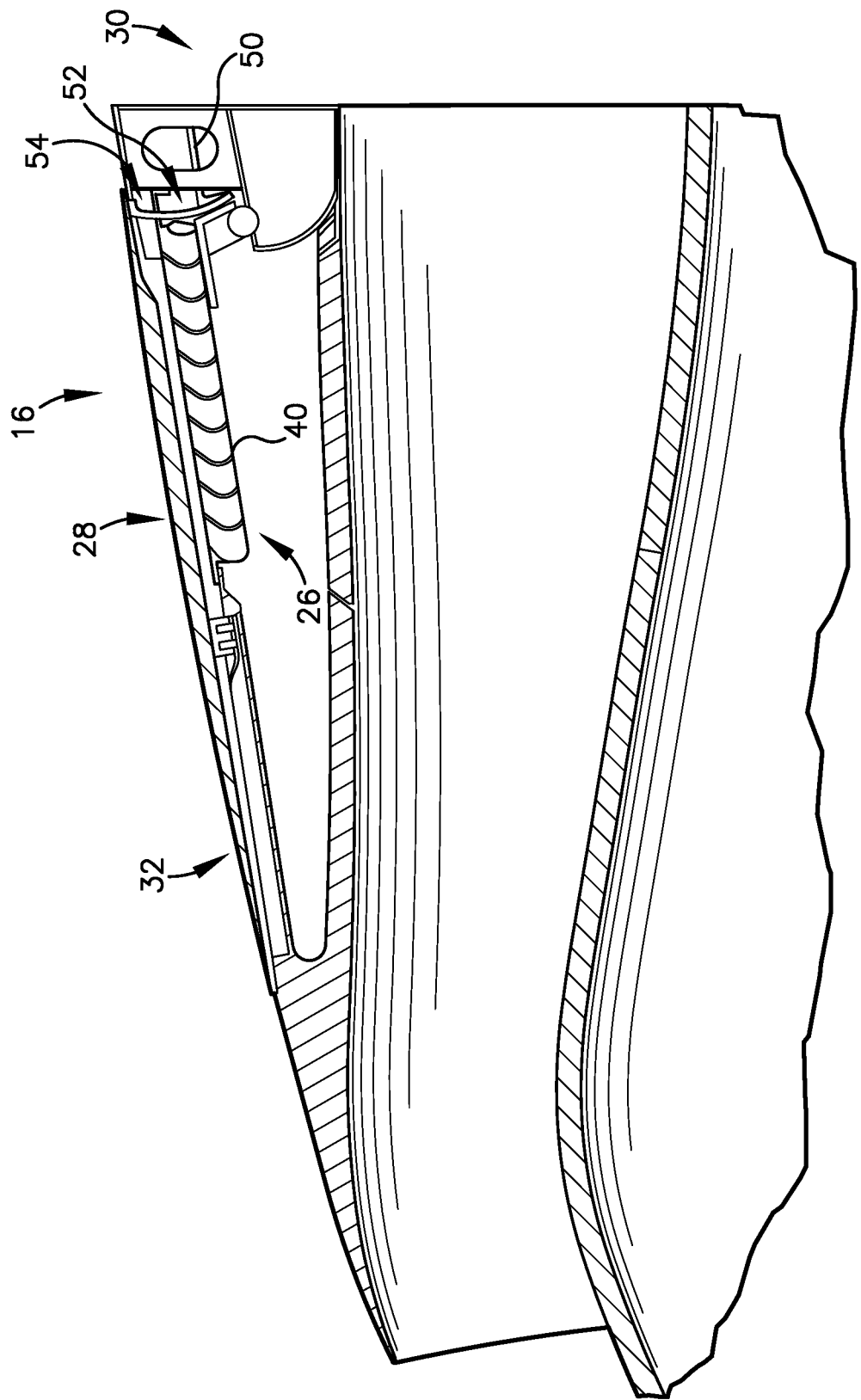
FIG. 2 is a sectional view of at least a portion of an aircraft engine thrust reverser in the stowed position.
Figures 7, 8:
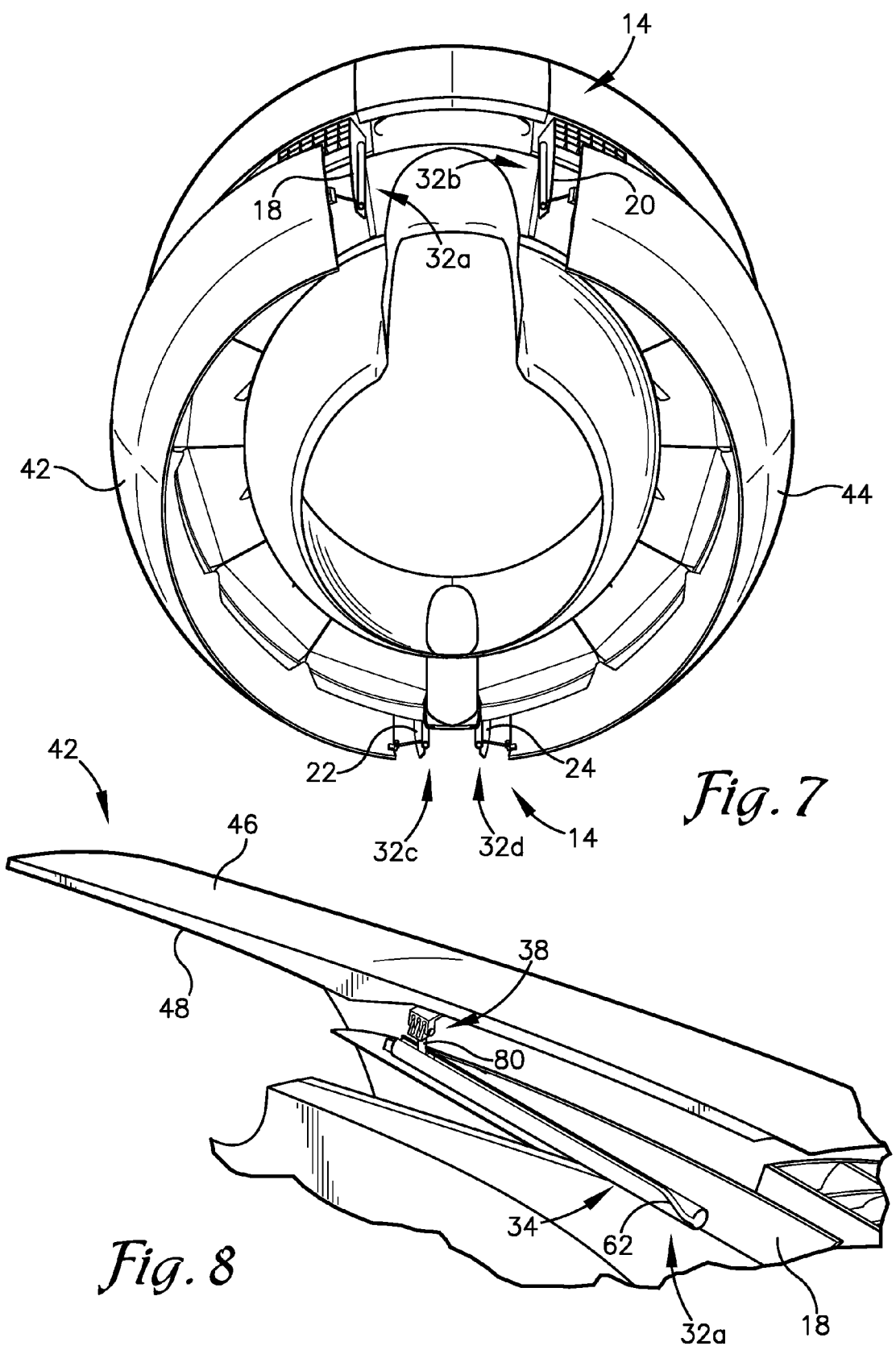
FIG. 7 is a rear view of the aircraft engine nacelle showing at least a portion of the thrust reverser in the deployed position.
FIG. 8 is a fragmentary perspective view of the aircraft engine nacelle showing a close-up of one of the translating sleeve assemblies.

An under-wing aircraft engine 10, shown in FIG. 1, may include a nacelle 12 that covers and protects the internal engine 10 components. The engine 10 may further include a plurality of support beams 14, as shown in FIG. 7, and a thrust reverser 16, as shown in FIGS. 2-3. The support beams 14 may include an upper left support beam 18, an upper right support beam 20, a lower left support beam 22, and a lower right support beam 24. The support beams 14 extend along a portion of the length of the engine 10 and provide some structural framework for the engine 10. The thrust reverser 16 may be a cascade-type of thrust reverser 16 that includes, among other components, a plurality of cascade elements 26, an outer cowl shroud 28, and a plurality of actuating units 30. A translating sleeve assembly 32, shown in FIGS. 2-4, as constructed in accordance with various embodiments of the current invention may be used with the thrust reverser 16 and may broadly comprise a slider track 34, a lifting bolt 36, and a hinge 38.

Figure 6:
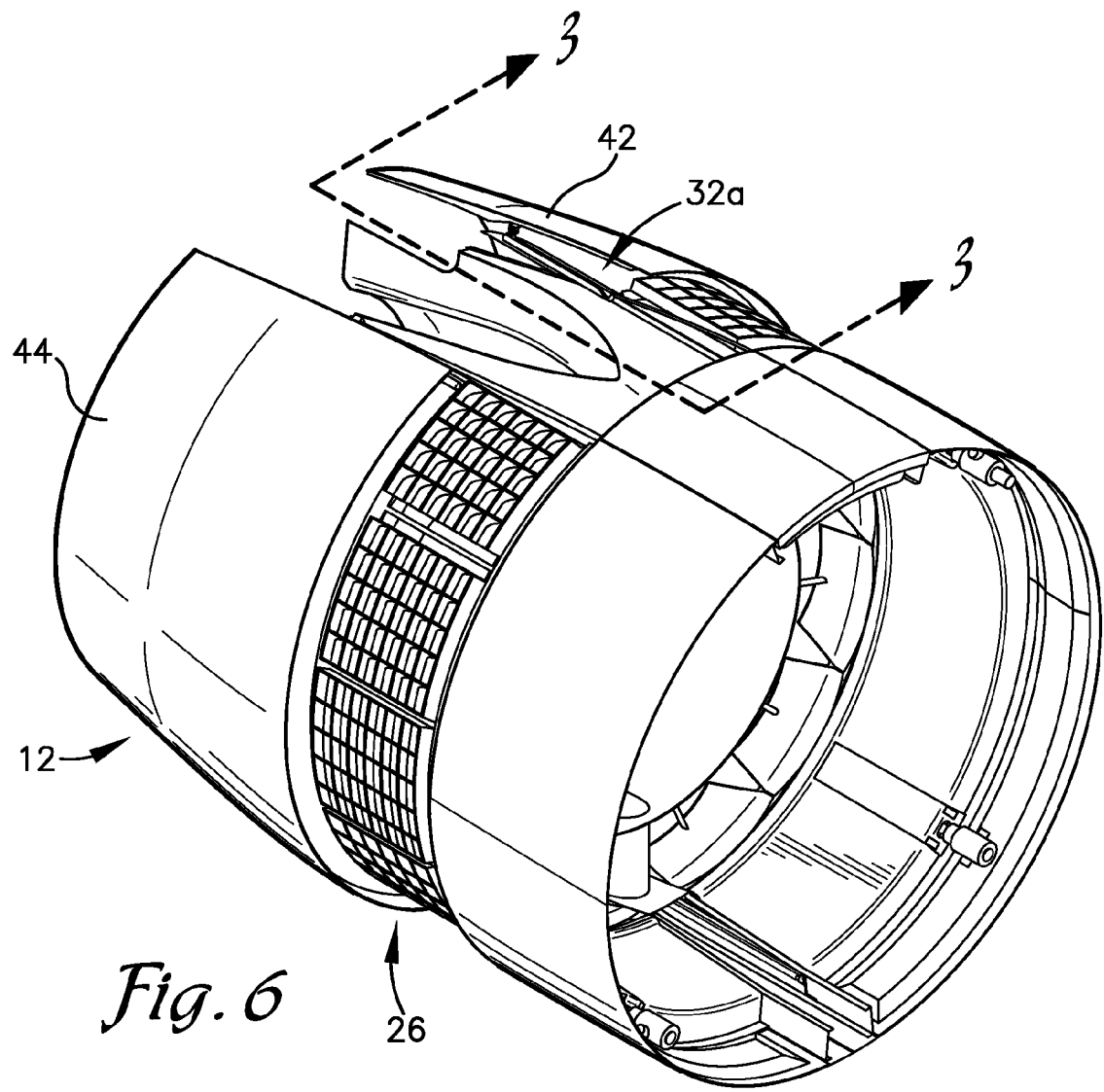
FIG. 6 is a perspective view of the aircraft engine nacelle showing at least a portion of the thrust reverser in the deployed position.

The cascade elements 26, best seen in FIGS. 2-3 and 6, may include an array of arcuate vanes 40 that possess a curvature such that the outer edges of the vanes 40 are pointing generally forward. In some embodiments, multiple cascade elements 26 may be positioned adjacent one another to form a band along the circumference of the engine 10. In other embodiments, there may be a single elongated cascade element located along the circumference of the engine 10. The cascade elements 26 may be covered by the outer cowl shroud 28 when the thrust reverser 16 is stowed. During deployment of the thrust reverser 16, the cascade elements 26 generally direct airflow, exhaust gases, or a combination thereof in a forward direction relative to the engine 10.

The outer cowl shroud 28, also known as a sleeve, may include a left outer cowl shroud 42 and a right outer cowl shroud 44, best seen in FIG. 7, both of which may have a generally semi-cylindrical shape and, in combination, may form an aft portion of the nacelle 12 that is separable from the rest of the nacelle 12. The left outer cowl shroud 42 and the right outer cowl shroud 44 may both include an outer surface 46 and an inner surface 48. In various embodiments, the left outer cowl shroud 42 and the right outer cowl shroud 44 may be shaped and sized to be roughly symmetric about a central vertical plane.

When the thrust reverser 16 is stowed, the outer cowl shroud 28 may be positioned forwardly, such that at least a portion of the outer cowl shroud 28 is covering the cascade elements 26. When the thrust reverser 16 is deployed, the outer cowl shroud 28 may move aftward, as discussed in more detail below, to expose the cascade elements 26 and allow an airflow path through the cascade elements 26.

The actuating units 30 may include an actuator (not shown in the figures) and an actuator arm 50, seen in FIGS. 2-3. There may be at least four actuating units 30 located around the circumference of the engine 10. With each actuating unit 30, the actuator may be positioned forward of the cascade elements 26 and may be powered electrically, hydraulically, or the like. The actuator arm 50 may be coupled to an output of the actuator and may extend aftward to couple with the outer cowl shroud 28 through a push ring 52 and a shroud attach fitting 54.

The push ring 52 may be of a circular or disk shape and may be positioned around the circumference of the engine 10 inward from the cascade elements 26. The push ring 52 may be attached in multiple locations (four, in various embodiments) to the aft end of each actuator arm 50 and may further couple to the shroud attach fittings 54.

The shroud attach fitting 54 may include mechanical fastening components that couple the push ring 52 to the outer cowl shroud 28. In various embodiments, there may be four shroud attach fittings 54—a first shroud attach fitting 54 positioned on the inner surface 48 of the upper portion near the forward edge of the right outer cowl shroud 44, a second shroud attach fitting 54 positioned on the inner surface 48 of the lower portion near the forward edge of the right outer cowl shroud 44, a third shroud attach fitting 54 positioned on the inner surface 48 of the upper portion near the forward edge of the left outer cowl shroud 42, and a fourth shroud attach fitting 54 positioned on the inner surface 48 of the lower portion near the forward edge of the left outer cowl shroud 42.

The components of the translating sleeve assembly 32 may be best seen in FIG. 4. The slider track 34 may be of an elongated, hollow, generally tubular shape and may include a forward end 56, an aft end 58, a tubular sidewall 60, and a guide channel 62. There may be a gap along the circumference of the tubular sidewall 60 that extends the length of the slider track 34 in which the guide channel 62 is formed. Furthermore, the guide channel 62 may follow a curved path when moving from the forward end 56 of the slider track 34 to the aft end 58. For example, near the forward end 56, the guide channel 62 may be positioned at a first angle with respect to the central longitudinal axis of the slider track 34. Near the aft end 58, the guide channel 62 may be positioned at a second angle that is pivoted from the first angle. In various embodiments, the guide channel 62 may pivot approximately ninety degrees from the forward end 56 to the aft end 58, although greater or lesser angular rotations are possible.

The inner diameter of the slider track 34 may be slightly larger than the outer diameter of the lifting bolt 36. The lifting bolt 36 is generally positioned within the tubular sidewall 60 of the slider track 34 such that the hinge rod 80 fits within the guide channel 62. The lifting bolt 36 may be capable of sliding along the length of the slider track 34. Due to the curvature of the guide channel 62, the lifting bolt 36 may pivot about the longitudinal axis of the slider track 34 as the lifting bolt 36 slides along the length thereof.

The hinge 38 may include a first hinge element 64, a second hinge element 66, and a pin 68. Generally, the first hinge element 64 includes features that interleave with similar features on the second hinge element 66. In various embodiments, the first hinge element 64 may include a plurality of first fingers 70 with first spaces 72 in between. The second hinge element 66 may include a plurality of second fingers 74 with second spaces 76 in between at the same pitch as the first fingers 70 and the first spaces 72. The first hinge element 64 may couple with the second hinge element 66 such that the first fingers 70 fit in the second spaces 76 and the second fingers 74 fit in the first spaces 72. Each of the first fingers 70 and the second fingers 74 includes a hole near the outer edge of the finger through which the pin 68 may be placed. The pin 68 serves to prevent the first hinge element 64 from uncoupling with the second hinge element 66 in addition to providing an axis about which the first hinge element 64 and the second hinge element 66 both pivot.

The first hinge element 64 may further include a base 78 with a flat area that extends transversely to the first fingers 70 and couples with the inner surface 48 of the outer cowl shroud 28. The hinge 38 may be closed when the base 78 of the first hinge element 64 is positioned in close proximity to the lifting bolt 36. The hinge 38 may open as the first hinge element 64 and the second hinge element 66 pivot about the hinge pin 68 such that the first hinge element 64 moves away from the lifting bolt 36.

The second hinge element 66 may include a hinge rod 80 which couples to the lifting bolt 36. The hinge rod 80 may be of a solid generally cylindrical shape positioned along the same axis as the second fingers 74. The diameter of the hinge rod 80 may be slightly smaller than the width of the guide channel 62. The lifting bolt 36 may be of a solid generally cylindrical shape with a side wall. The hinge rod 80 may couple to the side wall of the lifting bolt 36.

The thrust reverser 16 may include more than one translating sleeve assembly 32. In various embodiments, there may be one translating sleeve assembly 32 implemented along each of the support beams 14.

A first translating sleeve assembly 32A may be implemented with the upper left support beam 18 such that the slider track 34 is attached along the length of the upper left support beam 18. The first hinge element 64 may be coupled to the inner surface 48 approximately midway along the length of the upper portion of the left outer cowl shroud 42.

A second translating sleeve assembly 32B may be implemented with the upper right support beam 20 such that the slider track 34 is attached along the length of the upper right support beam 20. The first hinge element 64 may be coupled to the inner surface 48 approximately midway along the length of the upper portion of the right outer cowl shroud 44.

A third translating sleeve assembly 32C may be implemented with the lower left support beam 22 such that the slider track 34 is attached along the length of the lower left support beam 22. The first hinge element 64 may be coupled to the inner surface 48 approximately midway along the length of the lower portion of the left outer cowl shroud 42.

A fourth translating sleeve assembly 32D may be implemented with the lower right support beam 24 such that the slider track 34 is attached along the length of the lower right support beam 24. The first hinge element 64 may be coupled to the inner surface 48 approximately midway along the length of the lower portion of the right outer cowl shroud 44.

The thrust reverser 16 and the translating sleeve assemblies 32 may operate as follows. When the thrust reverser 16 is stowed, the outer cowl shroud 28 may be in its forwardmost position such that the outer cowl shroud 28 covers the cascade elements 26, as seen in FIGS. 2 and 5. Furthermore, the push ring 52 may be at its forwardmost position, each of the actuator arms 50 may be retracted into the actuating units 30, and the lifting bolt 36 may be at the forward end 56 of the slider track 34 in each of the translating sleeve assemblies 32.

During deployment of the thrust reverser 16, the actuating units 30 may push each actuator arm 50 aftward, in turn translating the push ring 52 along with the shroud attach fittings 54 and the outer cowl shroud 28 aftward, as seen in FIGS. 3 and 6-8. The left outer cowl shroud 42 and the right outer cowl shroud 44 no longer cover the cascade elements 26. Thus, reverse thrust airflow may flow through the cascade vanes 40. With the left outer cowl shroud 42 and the right outer cowl shroud 44 being pushed aftward, the hinge 38 and the lifting bolt 36 of each translating sleeve assembly 32 may translate aftward as well. For each translating sleeve assembly 32, the lifting bolt 36 may slide within the slider track 34 and the hinge rod 80 may slide within the guide channel 62. While sliding aftward, the lifting bolt 36 may pivot about the longitudinal axis of the slider track 34 due to the curved path of the guide channel 62. Accordingly, the hinge 38 may open as the first hinge element 64 and the second hinge element 66 pivot about the hinge pin 68 such that the first hinge element 64 moves away from the lifting bolt 36.

Since the first hinge elements 64 of the first translating sleeve assembly 32A and the third translating sleeve assembly 32C are coupled to the inner surface 48 of the left outer cowl shroud 42, the pivoting of the lifting bolts 36 may provide a lifting force outward from center of the engine 10 for the left outer cowl shroud 42. Likewise for the right outer cowl shroud 44—since the first hinge elements 64 of the second translating sleeve assembly 32B and the fourth translating sleeve assembly 32D are coupled to the inner surface 48 of the right outer cowl shroud 44, the pivoting of the lifting bolts 36 may provide a lifting force outward from the center of the engine 10 for the right outer cowl shroud 44. The lifting of the left outer cowl shroud 42 and the right outer cowl shroud 44 also provides additional separation between the outer cowl shroud 28 and the cascade elements 26 such that the outer cowl shroud 28 presents minimal interference to the airflow through the cascade elements 26.

When the thrust reverser 16 is fully deployed, the actuator arm 50 of each of the actuating units 30 may be fully extended in the aftward direction. The lifting bolt 36 may be positioned near the aft end 58 of the slider track 34 for each of the translating sleeve assemblies 32. The left outer cowl shroud 42 and the right outer cowl shroud 44 may be at their most aftward position. Furthermore, the left outer cowl shroud 42 and the right outer cowl shroud 44 may be positioned outward from the forward portion of the nacelle 12 and farther away from the center of the engine 10 than when in the stowed position.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A translating sleeve assembly for use with an aircraft engine thrust reverser, the translating sleeve assembly comprising:
    a slider track having a guide channel formed therein that follows a curved path along a length thereof;
    a lifting bolt slidably positioned within the slider track; and
    a hinge coupled to an outer cowl shroud, the hinge including a hinge rod slidably positioned within the guide channel and coupled to the lifting bolt,
    wherein during deployment of the thrust reverser, the outer cowl shroud is pushed aftward such that the lifting bolt slides within the slider track and the hinge rod slides within the guide channel, urging the lifting bolt to pivot and the hinge to open, thereby lifting the outer cowl shroud away from the center of the aircraft engine.

2. The translating sleeve assembly of claim 1, wherein the hinge includes
a first hinge element with a base coupled to the outer cowl shroud,
a second hinge element coupled to the hinge rod, and
a pin about which the first hinge element and the second hinge element pivot.

3. The translating sleeve assembly of claim 2, wherein the first hinge element further includes a plurality of first fingers with first spaces in between and the second hinge element further includes a plurality of second fingers with second spaces in between, wherein the first fingers fit within the second spaces and the second fingers fit within the first spaces.

4. The translating sleeve assembly of claim 2, wherein the hinge opens as the first hinge element and the second hinge element pivot about the hinge pin such that the first hinge element moves away from the lifting bolt.

5. The translating sleeve assembly of claim 1, wherein the lifting bolt is generally cylindrical in shape with an outer diameter that is less than the inner diameter of the tubular sidewall.

6. A translating sleeve assembly for use with an aircraft engine thrust reverser, the translating sleeve assembly comprising:
a slider track having a guide channel formed therein that follows a curved path along a length thereof;
a lifting bolt slidably positioned within the slider track; and
a hinge including a first hinge element with a base coupled to an outer cowl shroud, a second hinge element with a hinge rod slidably positioned within the guide channel and coupled to the lifting bolt, and a pin about which the first hinge element and the second hinge element pivot,
wherein during deployment of the thrust reverser, the outer cowl shroud is pushed aftward such that the lifting bolt slides within the slider track and the hinge rod slides within the guide channel, urging the lifting bolt to pivot and the hinge to open, thereby lifting the outer cowl shroud away from the center of the aircraft engine.

7. The translating sleeve assembly of claim 6, wherein the first hinge element further includes a plurality of first fingers with first spaces in between and the second hinge element further includes a plurality of second fingers with second spaces in between, wherein the first fingers fit within the second spaces and the second fingers fit within the first spaces.

8. The translating sleeve assembly of claim 6, wherein the hinge opens as the first hinge element and the second hinge element pivot about the hinge pin such that the first hinge element moves away from the lifting bolt.

9. The translating sleeve assembly of claim 6, wherein the lifting bolt is generally cylindrical in shape with an outer diameter that is less than the inner diameter of the tubular sidewall.

10. An aircraft engine thrust reverser comprising:
a left outer cowl shroud including a first inner surface, a first lower portion, and a first upper portion;
a right outer cowl shroud including a second inner surface, a second lower portion, and a second upper portion;
a first translating sleeve assembly including a first hinge coupled to the first upper portion of the first inner surface, the first hinge operable to open while translating aftward;
a second translating sleeve assembly including a second hinge coupled to the second upper portion of the second inner surface, the second hinge operable to open while translating aftward;
a third translating sleeve assembly including a third hinge coupled to the first lower portion of the first inner surface, the third hinge operable to open while translating aftward; and
a fourth translating sleeve assembly including a fourth hinge coupled to the second lower portion of the second inner surface, the fourth hinge operable to open while translating aftward,
wherein during deployment of the thrust reverser, the left outer cowl shroud is pushed aftward along with the first hinge and the third hinge, thereby opening the first hinge and the third hinge such that the left outer cowl shroud is lifted away from the center of the aircraft engine, and the right outer cowl shroud is pushed aftward along with the second hinge and the fourth hinge, thereby opening the second hinge and the fourth hinge such that the right outer cowl shroud is lifted away from the center of the aircraft engine.

11. The aircraft engine thrust reverser of claim 10, further including—
an upper left support beam to which the first translating sleeve assembly is coupled;
an upper right support beam to which the second translating sleeve assembly is coupled;
a lower left support beam to which the third translating sleeve assembly is coupled; and
a lower right support beam to which the fourth translating sleeve assembly is coupled.

12. The aircraft engine thrust reverser of claim 10, wherein each of the translating sleeve assemblies further includes—
a slider track having a guide channel formed therein that follows a curved path along a length thereof,
a lifting bolt slidably positioned within the slider track,
a first hinge element with a base coupled to the left outer cowl shroud or the right outer cowl shroud,
a second hinge element with a hinge rod slidably positioned within the guide channel and coupled to the lifting bolt, and
a pin about which the first hinge element and the second hinge element pivot,
wherein during deployment of the thrust reverser, the lifting bolt slides within the slider track and the hinge rod slides within the guide channel, urging the lifting bolt to pivot and the hinge to open.

13. The translating sleeve assembly of claim 12, wherein the first hinge element further includes a plurality of first fingers with first spaces in between and the second hinge element further includes a plurality of second fingers with second spaces in between, wherein the first fingers fit within the second spaces and the second fingers fit within the first spaces.

14. The translating sleeve assembly of claim 12, wherein the hinge opens as the first hinge element and the second hinge element pivot about the hinge pin such that the first hinge element moves away from the lifting bolt.

15. The translating sleeve assembly of claim 12, wherein the lifting bolt is generally cylindrical in shape with an outer diameter that is less than the inner diameter of the tubular sidewall.

* * * * *